July 2, 1963  T. W. CLEMENTS  3,095,891
PNEUMATIC TRANSMITTERS
Filed Sept. 18, 1961  2 Sheets-Sheet 2

INVENTOR.
THOMAS W. CLEMENTS
BY
B. T. Wobensmith
ATTORNEY

United States Patent Office 3,095,891
Patented July 2, 1963

3,095,891
PNEUMATIC TRANSMITTERS
Thomas W. Clements, Huntington, N.Y., assignor to Moore Products Co., Philadelphia, Pa., a corporation of Pennsylvania
Filed Sept. 18, 1961, Ser. No. 138,654
15 Claims. (Cl. 137—85)

This invention relates to pneumatic transmitters and more particularly to a transmitter which transmits a pressure proportional to the square root of a measured variable, which measured variable may be a force or a pressure.

Various types of instruments have heretofore been proposed for square root extraction, but these have required the use of many delicate connecting links and pivots, are particularly susceptible to variations due to misalignment of parts such as nozzles and vanes, require the use of flexible hoses and have other objectionable features.

It is the principal object of the present invention to provide a pneumatic transmitting device for producing a transmitted pressure proportional to the square root of a measured variable which is simple in construction, and is accurate and reliable in operation.

It is a further object of the present invention to provide a pneumatic transmitting device for producing a transmitted pressure proportional to the square root of a measured variable which has a stable output and improved frequency response.

It is a further object of the present invention to provide a pneumatic transmitting device for producing a transmitted pressure proportional to the square root of a measured variable in which a nozzle pressure and an output pressure each act on wall portions that are movable together in the same direction.

It is a further object of the invention to provide a pneumatic transmitting device for producing a transmitted pressure proportional to the square root of a measured variable in which an input member is provided having a chamber with a portion movable in a predetermined direction, an output member is provided having a portion movable in a different predetermined direction and a valve is provided having a controlling part for positioning with respect to a discharge port of the output member and is pivotally supported by the input member.

It is a further object of the present invention to provide a pneumatic transmitting device for producing a transmitted pressure proportional to the square root of a measured variable having relatively movable input and output portions with an interposed valve member cooperating therewith, the valve member being collapsible for insertion and for avoiding damage.

It is a further object of the present invention to provide a pneumatic transmitting device for producing a transmitted pressure proportional to the square root of a measured variable which has simple but effective provisions for zero and span adjustment.

It is a further object of the present invention to provide a pneumatic transmitting device for producing a transmitted pressure proportional to the square root of a measured variable which employs a telescoping link which prevents excess force on the output and input assemblies and permits installation of the link without removing the input section.

It is a further object of the present invention to provide a computing relay for converting a square root related signal to its linear equivalent and which is useful for but not limited to linearizing signals from differential pressure type flow transmitters, when two or more rate of flow signals are to be added or subtracted, when greater indication and control rangeability are required, when linear signals are required to provide proper characterization in open loop and multiple loop control systems, or when required in various analogue computing systems.

Other objects and advantageous features of the invention will be apparent from the description and claims.

The nature and characteristic features of the invention will be more readily understood from the following description, taken in connection with the accompanying drawings forming part thereof, in which.

Figure 1:
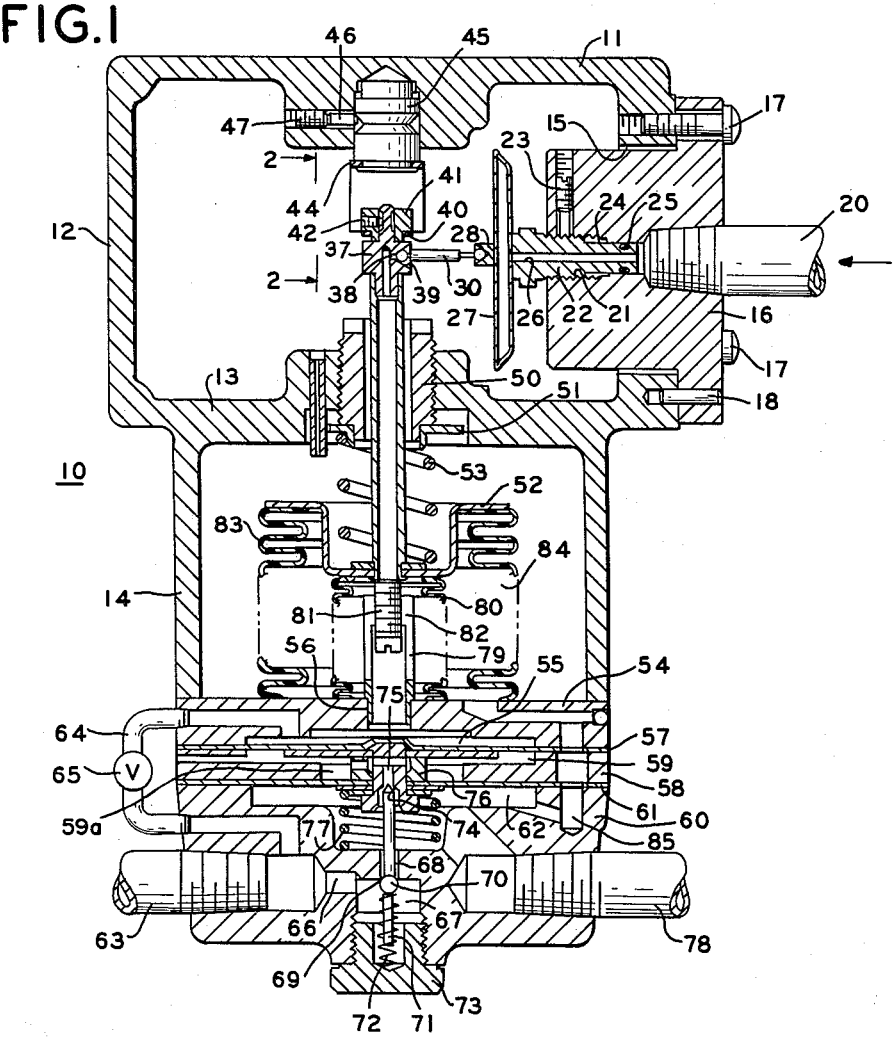
FIGURE 1 is a vertical central sectional view of a pneumatic transmitter in accordance with the invention.
Figure 2:
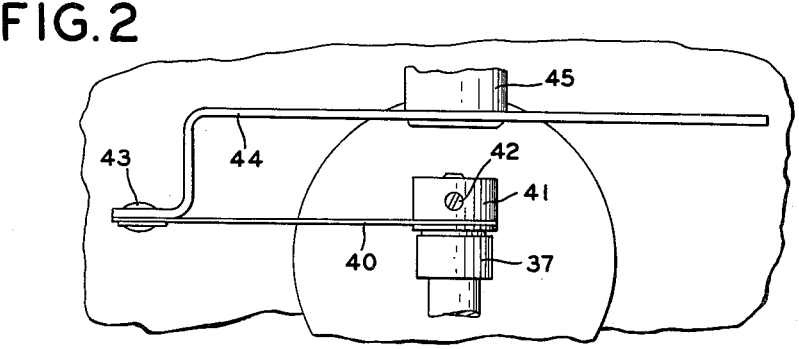
FIG. 2 is a fragmentary vertical sectional view, enlarged, taken approximately on the line 2—2 of FIG. 1.

It should, of course, be understood that the description and drawings herein are illustrative merely, and that various modifications and changes can be made in the structure disclosed without departing from the spirit of the invention.

Like numerals refer to like parts throughout the several views.

The apparatus for carrying out the invention consists of three components, an input capsule, an output bellows with a nozzle, and an interposed floating pilot link controlling the nozzle. The output signal is advantageously transmitted by a booster pilot valve.

Referring now more particularly to the drawings, a housing 10 is provided having an upper horizontal wall 11, an upper side wall 12 extending downwardly therefrom, a central partition wall 13, and a lower side wall 14 extending downwardly from the partition wall 13.

The housing 10 has a side opening 15 between the upper wall 11 and the central partition wall 13 with a mounting block 16 secured thereto by screws 17. One or more indexing pins 18 can also be provided to insure accurate positioning of the mounting block on the housing 10.

The mounting block 16 has a pipe 20 connected thereto which serves as an input fluid pressure connection for the delivery thereto of the input or control pressure.

The mounting block 16 has a threaded opening 21 therein for the reception of an adjustable capsule mounting screw 22 which can be locked at any desired adjusted position by a set screw 23. The capsule mounting screw 22 has an outwardly extending plug 24 with a packing ring 25 thereon for preventing fluid leakage. The capsule mounting screw 22 has a central opening 26 therethrough in communication with the interior of an input pressure responsive capsule 27.

Figure 3:
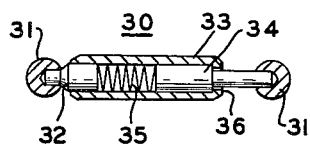
FIG. 3 is an enlarged fragmentary sectional view showing the structural details of one form of link.

The capsule 27 has a socket 28 thereon for the reception at one end of a link 30, of predetermined length, but capable of being shortened lengthwise, if desired. The link 30 is shown in a detailed form in FIG. 3. The link 30 illustrated includes opposite end spherical balls 31, one of which is carried on a stem 32 fixed in a link sleeve 33 and the other of which is carried on a movable stem 34. A spring 35 in the sleeve 33 and abutting the opposed faces of the stems 32 and 34 normally urges the stem 34 to an extended position determined by the length of the sleeve 33 and its inturned end 36, but permits reduction in length of the link 30 for installation or in the event of undue compression stresses being applied thereon.

A nozzle tube 37 is provided extending through the central partition wall 13 and at its upper end has a nozzle 38 extending outwardly at one side thereof with a flared guide 39 for the reception of one of the balls 31. The upper end of the nozzle tube 37 is controlled as to its movement, and for this purpose a leaf spring 40 is held in engagement with the upper end thereof by a collar 41 with a set screw 42. The other end of the leaf spring 40 is connected, such as by a rivet 43, to a spring support lever 44 which is mounted on a head 45 for pivotal movement of the head 45, the support lever 44, and the leaf spring 40 with respect to the upper horizontal wall 11 of the housing 10.

The head 45 is adapted to be locked in a selected position of adjustment by a pin 46 which is engaged by a set screw 47 carried in the upper wall 11 of the housing 10 and forcing the head 45 upwardly, in locked position.

The nozzle tube 37 extends downwardly through a sleeve 50 spaced therefrom, the sleeve 50 being in threaded engagement in the central partition wall 13. The sleeve 50, at its lower end, carries a spring abutment plate 51.

The nozzle tube 37, at its lower end, is secured to a bellows closure plate 52. A helical spring 53 is provided in engagement with the spring abutment 51 and with the closure plate 52, the force exerted by the spring 53 being determined by the adjustment of the position of the sleeve 50.

At the lower end of the lower side wall 14, a closure disc 54 is provided, and held in fixed relation thereto. The disc 54 has a pressure chamber 55 formed in the lower portion thereof communicating with a central opening 56. A diaphragm 57, bounding the chamber 55, is held in position at its periphery by a lower disc 58 which has an upper chamber portion 59 therein bounded by the diaphragm 57 and a lower communicating chamber portion 59a of smaller effective area. The chambers 55 and 59 have the same effective areas on opposite sides of the diaphragm 57.

A pilot housing section 60 is provided with a diaphragm 61 interposed between the housing section 60 and the disc 58. The pilot housing section 60 has a chamber 62 therein bounded by the diaphragm 61.

The pilot housing section 60 has a fluid supply connection 63 connected thereto for the supply of pressure regulated and filtered fluid, such as air, under pressure. A bypass connection 64 having a restriction 65 therein is connected between the supply connection 63 and the chamber 55 for supplying fluid under pressure to the nozzle tube 37 and nozzle 38.

The fluid supply connection 63 has a passageway 66 leading to a valve chamber 67. A valve port 68 having a seat 69 which is controlled by a valve ball 70 carried on a valve stem 71 extends from the valve chamber 67. The valve stem 71 has a spring 72 thereon engaged with the valve ball 70 and in a threaded end closure plug 73 carried by the pilot housing section 60. The valve stem 71 is engageable with a seat 74 at the lower end of a port 75 carried in a diaphragm spacing member 76 with which the diaphragms 57 and 61 are in engagement. A compression spring 77 disposed in the chamber 62 is in engagement with the spacing member 76.

The chamber 62 has an output pressure connection 78 in communication therewith for the delivery of the output pressure.

The chamber 55 has a connector 79 carried by the disc 54 extending therefrom to the interior of a flexible metallic bellows 80. The bellows 80 is secured at its lower end in fluid tight relation to the disc 54 and is secured at its upper end to the closure plate 52. The connector 79 has an internally threaded upper end for the reception of a stop screw 81, an access slot 82 providing for delivery of fluid from the interior of the connector 79. The closure plate 52 has a rim portion with an outer flexible metallic bellows 83 connected thereto in fluid tight relation, the lower end of the bellows 83 being secured in fluid tight relation to the upper face of the disc 54. A fluid pressure chamber 84 is thus provided between the bellows 80 and the bellows 83 with which a passageway 85 extending from the chamber 62 is in communication for applying in the chamber 84 the delivered pressure at the output pressure connection 78.

Figure 4:
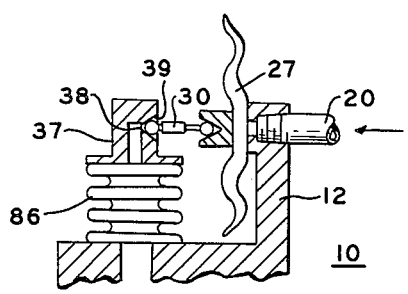
FIG. 4 is a diagrammatic view illustrating one condition of operation.
Figure 5:
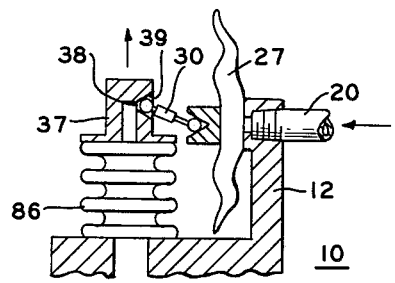
FIG. 5 is a diagrammatic view illustrating another condition of operation.

In FIGS. 4 and 5 of the drawings, for purposes of explanation, the nozzle tube 37 is shown as greatly shortened, but is shown as having fluid pressure applied thereto through a flexible bellows 86 which corresponds substantially to the bellows 83. The structure for limiting the movement of the free end of the nozzle tube 37 has been omitted from FIGS. 4 and 5.

The mode of operation will now be pointed out.

The operation of the structure utilizes the cosine function of the small angle which is developed in a continuous balance between the motion of the input pressure capsule 27 and the motion of the nozzle 38 as determined by the back pressure thereon. The input pressure effective in the capsule 27 results in movement in a predetermined direction and acts to move the floating pilot link 30, affecting the nozzle clearance at the other end of the link. This motion changes the output pressure in the chamber 84 and moves the nozzle 38 to restore equilibrium as shown in FIGS. 4 and 5. The movement of the nozzle tube 38 and the nozzle 37 is in a different predetermined direction but with the axes of movement intersecting at an angle of 90° or close thereto but not exceeding a departure of up to about 10° or 15°. If the angle of displacement is small then the angle is proportional to the square root of the displacement of the input element.

If the input pressure is applied through the fluid connection 20 and to the interior of the capsule 27, the pressure is effective for urging the socket 28 and the link 30 toward the left as seen in FIGS. 1, 4 and 5.

Fluid under pressure supplied through the supply connection 63 is available through the orifice or restriction 65 and the fluid connection 64 to and through the chamber 55 for delivery to and through the nozzle tube 37 and the nozzle 38 for discharge as permitted by the ball 31 of the link 30.

Fluid from the supply connection 63 is delivered to the chamber 67 and through the port 68 as determined by the positioning of the diaphragm assembly which includes the diaphragm 57, the diaphragm 61, and the diaphragm spacing member 76.

The pressure in the chamber 62 is effective for urging the diaphragm assembly upwardly for repositioning of the diaphragm assembly.

The discharge of pressure fluid through the nozzle 38 as determined by the clearance of the ball 31 determines the control pressure in the chamber 55 of the booster pilot, and this in turn determines the output pressure at the fluid connection 78.

The link 30 in its relation to the nozzle 38 is such that the link 30 is always subject to air flow against one of the balls 31 at the nozzle 38 and this eliminates or minimizes friction at the other ball 31 and its socket 28. Backlash and hysteresis of the square root extracting mechanism is thus eliminated and a low response level or resolution is obtained.

The spherical ends on the link 30 provided by the balls 31 eliminate problems of nozzle alignment and of nozzle squareness. At the same time the structure is exceedingly simple and rugged.

The lever 44 and its locking mechanism provide a frictionless guide for the free end of the nozzle tube 37 and also a span adjustment with an offset to vertical motion in the direction of positioning of the spring 40. This offset motion or a component can be directed into the input motion so that less input motion is necessary to drive the output full scale. The offset motion or a component can be directed away from the input motion so that more input motion is necessary to drive the output full scale. Variations between the two extremes are, of course, available.

The telescoping link 30 prevents excessive force on the output and the input assemblies if either the supply is shut off with the input pressure applied or excess input pressure is applied. Installation of a link 30 without removing the input section can also be readily effected.

By applying the booster pilot valve input, which is the back pressure from the nozzle 38, inside the bellows 80, this pressure aids the motion feedback without any delay in waiting for the effect of the booster output even if there is considerable lag in the output pressure. There is, accordingly, better stability with less tendency to hunt or overshoot in response to input changes.

The input motion is shown as derived from an input pressure, but this motion could be obtained in any other manner.

I claim:

1. In combination, an input member having a portion movable in a predetermined direction in response to a variable, a source of fluid under pressure, an output member connected to said source and having a portion with a discharge port movable in a different predetermined direction, a valve member having one part pivotally connected to said input member portion for like movement therewith and another part for positioning with respect to said discharge port for determining the pressure upstream of said port, and fluid pressure actuated members controlled by said upstream pressure.

2. The combination as defined in claim 1 in which the axes of the predetermined directions of movement intersect at about 90°.

3. In combination, a housing, an input member carried by said housing and having a portion movable in a predetermined direction in response to a variable, a source of fluid under pressure, a nozzle tube connected to said source and having a discharge nozzle, said nozzle tube being movable in a different predetermined direction, members in said housing for positioning said nozzle tube including a first pressure responsive wall portion and a second pressure responsive wall portion, a fluid pressure transmitter controlled by the pressure in said nozzle tube, fluid connections for applying the pressure in said nozzle tube on one of said wall portions, fluid connections for applying the transmitted pressure on the other of said wall portions in the same direction, and a valve member having a part pivotally connected to said input member portion and another part controlling the discharge from said nozzle and thereby controlling the pressure upstream of said nozzle.

4. The combination as defined in claim 3 in which said valve member is collapsible in response to forces applied thereon above a predetermined level.

5. The combination as defined in claim 3 in which said valve member has end portions with an interposed portion urging said end portions to predetermined positions.

6. The combination as defined in claim 3 in which the axes of the predetermined directions of movement intersect at about 90°.

7. The combination as defined in claim 3 in which a mounting member is provided for one end of said nozzle tube for determining the plane of movement of said one end.

8. The combination as defined in claim 3 in which one end of said nozzle tube is controlled by said members for positioning and the other end of said tube has said nozzle disposed therein and an adjustable mounting member is provided for determining the plane of movement of said other end.

9. In combination, an input member having a portion movable in a predetermined direction in response to a variable, a source of fluid under pressure, a discharge nozzle member connected to said source, a valve member having one part pivotally connected to said input portion for like movement therewith and another part partially obstructing said nozzle member, said two parts being rigidly connected to each other, pressure regulating means responsive to the opening of said nozzle member for establishing an output pressure, pressure responsive means for moving said nozzle member in response to changes in said output pressure, and guiding means for directing the motion of said nozzle member in a different predetermined direction.

10. The combination defined in claim 9 in which said guiding means is adjustable to vary the component of motion of said nozzle portion in the axis of motion of the input member portion.

11. In combination, an input member having a portion movable in a predetermined direction in response to a variable, a source of fluid under pressure, an output member connected to said source and having a portion with a discharge port movable in a different predetermined direction, a valve member having one part pivotally connected to said input member portion and another part for positioning with respect to said discharge port for determining the pressure upstream of said port, and fluid pressure actuated members controlled by said upstream pressure, said valve member being collapsible in response to forces applied thereon above a predetermined level.

12. In combination, an input member having a portion movable in a predetermined direction in response to a variable, a source of fluid under pressure, an output member connected to said source and having a portion with a discharge port movable in a different predetermined direction, a valve member having one part pivotally connected to said input member portion and another part for positioning with respect to said discharge port for determining the pressure upstream of said port, and fluid pressure actuated members controlled by said upstream pressure, said valve member having end portions with an interposed portion urging said end portions to predetermined positions.

13. In combination, an input member having a portion movable in a predetermined direction in response to a variable, a source of fluid under pressure, a discharge nozzle member connected to said source, a valve member having one part pivotally connected to said input portion and another part partially obstructing said nozzle member, said two parts being rigidly connected to each other, pressure regulating means responsive to the opening of said nozzle member for establishing an output pressure, pressure responsive means for moving said nozzle member in response to changes in said output pressure, and guiding means for directing the motion of said nozzle member in a different predetermined direction, said valve member being collapsible in response to forces applied thereon above a predetermined level.

14. The combination as defined in claim 13 in which the axes of the predetermined directions of movement intersect at about 90°.

15. In combination, an input member having a portion movable in a predetermined direction in response to a variable, a source of fluid under pressure, an output member connected to said source and having a portion with a discharge port movable in a different predetermined direction, a valve member, a bearing portion on said input member for locating a point, a bearing portion on said valve member for locating a point with respect to said valve member, said points being coincident in the operating range, said valve member having another part for positioning with respect to said discharge port for determining the pressure upstream of said port, and fluid pressure actuated members controlled by said upstream pressure.

References Cited in the file of this patent

UNITED STATES PATENTS 2,986,151    Shannon _____ May 30, 1961